United States Patent [19]

Andersson et al.

[11] Patent Number: 5,813,512
[45] Date of Patent: Sep. 29, 1998

[54] SINGULATOR AND ALLOCATOR ELONGATED MEMBERS

[75] Inventors: Bert L. Andersson; Douglas A. Foster, both of Salmon Arm, Canada

[73] Assignee: Newnes Machine Ltd., Salmon Arm, Canada

[21] Appl. No.: 616,201

[22] Filed: Mar. 15, 1996

[30] Foreign Application Priority Data

May 23, 1995 [CA] Canada .................................. 2149948

[51] Int. Cl.⁶ ............................................... B65B 47/26
[52] U.S. Cl. ................................. 198/459.5; 198/463.5
[58] Field of Search ........................... 198/459.5, 463.5, 198/836.2

[56] References Cited

U.S. PATENT DOCUMENTS

| | | | |
|---|---|---|---|
| 4,330,055 | 5/1982 | Lunden | 198/463.5 |
| 5,518,106 | 5/1996 | Allard | 198/459.5 |
| 5,662,203 | 9/1997 | St-Pierre et al. | 198/459.5 |

FOREIGN PATENT DOCUMENTS

| | | |
|---|---|---|
| 502863 | 2/1920 | France . |
| 274767 | 8/1913 | Germany . |
| 2320033 | 10/1974 | Germany ........................ 198/463.5 |
| 19 40 026 | 7/1978 | Germany . |
| 409 839 | 10/1979 | Sweden . |

*Primary Examiner*—Joseph E. Valenza
*Attorney, Agent, or Firm*—Larson & Taylor

[57] ABSTRACT

A stick allocator for transferring laterally aligned sticks between a holding location on a longitudinal in-feed transfer means and a high-speed longitudinal out-feed transfer means has a lower, selectively rotatable, stick lifting and translation means, disposed generally beneath the holding location, for frictionally engaging a lower surface of a stick held laterally in the holding location. Lifting the stick frictionally engages an upper surface of the stick with an upper, selectively rotatable, stick receiving and translating means, disposed generally above the holding location. The upper, selectively rotatable, stick receiving and translating means frictionally engages the upper surface of the stick and biases the stick against the lower, selectively rotatable, stick lifting and translating means. The upper, selectively rotatable, stick receiving and translating means and the lower, selectively rotatable, stick lifting and translating means selectively translates the stick held there-between in a forward longitudinal direction from the holding location so as to selectively deposit the stick onto the high-speed longitudinal out-feed transfer means.

9 Claims, 5 Drawing Sheets

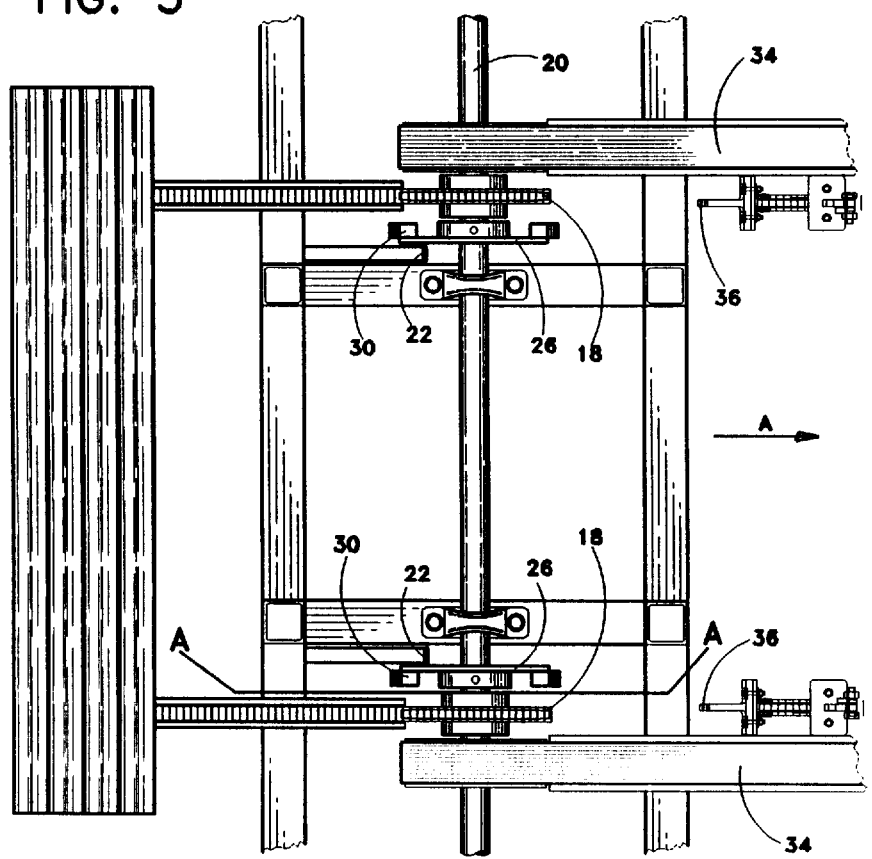

SINGULATOR AND ALLOCATOR ELONGATED MEMBERS

FIELD OF THE INVENTION

This invention relates to the field of sawmill machinery and in particular to devices for singulating and allocating elongated members such as sticks from an in-feed conveyor onto a device for placing elongate members onto stacks of lumber.

BACKGROUND OF THE INVENTION

In the prior art it is well known to use so-called "J"-hook stick placers to place an array of spacing sticks between tiers of lumbers in a stack of lumber. In order for such a device to operate efficiently, sticks have to be reliably supplied, aligned laterally to the stick placer, and in a timely fashion, so that when it is desired to load a J-hook on an endless conveyor of such J-hooks that a stick will be timely positioned for pickup by the desired J-hook. It is important that the desired J-hook be loaded with a stick so that the automated deposit mechanism of the J-hook stick placer deposit the spacing sticks in the correct position on the stack of lumber ready for the next tier of lumber to be overlaid.

Thus, in U.S. Pat. No. 4,144,976 which issued to Rysti on Mar. 20, 1979 for a Method and Apparatus for Providing Lumber Stacks with Stickers, it may be seen that sticks are stacked vertically in a magazine and fed from the bottom of the magazine by a conveyor belt moving the sticks individually into a pick up position in the path of J-hooks on a J-hook stick placer device. The speed with which the J-hook stick placer device may be operated is limited by the feed rate of the sticks from the magazine and the device complicated by the fact that sticks must be fed or placed into the magazine in such a manner that they do not jam. Sticks are often non-uniform in that they may be warped and of different lengths, widths and thicknesses. The present invention addresses the problem of providing reliable high speed delivery of elongate members such as sticks for pick up by a J-hook stick placing device operating at high speed by the provision of an intermediate high speed conveyor having its own selectively actuable feed mechanism for reliably feeding elongate members such as sticks from a conventional in-feed conveyor such as a transfer chain and rapidly moving the sticks in a spaced timed fashion for proper positioning in the path of J-hooks on a J-hook stick placer device.

The feeding mechanism of the present invention for feeding elongate members such as sticks from an in-feed transfer chain onto an intermediate high speed conveyor uses rotating arms as rising cam surfaces to force an elongate member upwards from behind a stop into positive engagement between the rising cam surface and a simultaneously moving resilient band. The resilient band holds the elongate member, which may be of varying widths and thicknesses, against the rising cam surface as the rising cam surface is rotated so as to lift and translate the elongate member from behind the stop and over the stop so as to place the elongate member in a timed and controlled fashion onto the simultaneously moving intermediate conveyor. Preferably the stick is translated onto the intermediate conveyor by the resilient band and rising cam surface at the same speed as the conveyance speed of intermediate conveyor. Rotation of the rising cam surface, the resilient belt, and the intermediate belt is selectively actuable such as by a computer controlled clutch mechanism so as to feed elongate members such as sticks into the path of J-hooks on a J-hook stick placing device in a timed synchronized fashion. Thus only desired J-hooks on the J-hook stick placing device are fed with elongate members such as sticks. This facilitates placement of varying lengths, widths and thicknesses of sticks in the correct position atop a stack of lumber of varying lengths.

In the prior art, Applicant is aware of U.S. Pat. No. 3,031,061 which issued on Apr. 24, 1962 to Rambo et al for an Automatic Unit Feeding and Spacing Mechanism. Rambo teaches using a rotatable disc with rising cam surfaces on radially extending arms so as to lift elongate members over a stop and onto an intermediate conveyor belt so as to deposit the elongate members from the intermediate conveyor in between the lugs of a downstream conveyor chain in a synchronized fashion. Once the front edge of the elongate member is raised above the stationary stop, the pressure of the series of elongate members to the rear of the raised elongate member push or tip over the stop the front edge of the elongate member raised by the cam surface. What is neither taught nor suggested is the positive holding of the elongate member down against the rising cam surface so as to positively control the transfer of elongate objects onto the intermediate conveyor in a high speed environment.

SUMMARY OF THE INVENTION

A stick allocator for transferring laterally aligned sticks between a holding location on a longitudinal in-feed transfer means and a high-speed longitudinal out-feed transfer means has a lower, selectively rotatable, stick lifting and translation means, disposed generally beneath the holding location, for frictionally engaging a lower surface of a stick held laterally in the holding location. Lifting the stick frictionally engages an upper surface of the stick with an upper, selectively rotatable, stick receiving and translating means, disposed generally above the holding location. The upper, selectively rotatable, stick receiving and translating means frictionally engages the upper surface of the stick and biases the stick against the lower, selectively rotatable, stick lifting and translating means. The upper, selectively rotatable, stick receiving and translating means and the lower, selectively rotatable, stick lifting and translating means selectively translates the stick held there-between in a forward longitudinal direction from the holding location so as to selectively deposit the stick onto the high-speed longitudinal out-feed transfer means.

Advantageously, the lower, selectively rotatable, stick lifting and translating means has a radially extending cam means for frictionally engaging the lower surface of the stick held laterally in the holding location. The radially extending cam means is selectively rotatable about a lateral axis of rotation. The upper, selectively rotatable, stick receiving and translating means has a continuous, selectively rotatable, stick engaging surface selectively rotatable in a longitudinal direction corresponding to the longitudinal direction of rotation of the selectively rotatable radially extending cam means. The continuous stick engaging surface is selectively rotatable at a longitudinal velocity corresponding to a longitudinal velocity of the radially extending cam means. The continuous stick engaging surface is resiliently deformable, and, when in a non-deformed state, is a third vertical distance measured generally vertically above the lateral axis of rotation. The difference between said first vertical distance and said third vertical distance less than the thickness of the stick lifted from the holding location. Preferably, the upper, selectively rotatable, stick receiving and translating means and lower selectively rotatable stick lifting and translating means are simultaneously selectively rotatable.

Further advantageously, the longitudinal in-feed transfer means translates the sticks in the forward longitudinal direction at a first speed and the high speed longitudinal out-feed transfer means translates the sticks in the forward longitudinal direction at a second speed, and the second speed is greater than the first speed.

In a preferred embodiment, the continuous stick engaging surface is a resiliently deformable belt extending longitudinally in a continuous loop lying in a first plane. The first plane is parallel to a second plane containing a radially spaced array of the radially extending cam means. Preferably, the first plane and the second plane are generally vertical. The radially spaced array of radially extending cam means may have a radially spaced array of radially extending arms rigidly mounted to, and radially extending outward from, a selectively rotatable hub which is selectively rotatable about the lateral axis of rotation. The radially extending arms have radially outward facing frictional surfaces on their outermost or distal ends.

In the preferred embodiment the resiliently deformable belt extends continuously around a longitudinally opposed pair of pulleys, wheels, sprockets or the like. The longitudinally opposed pair of pulleys, in longitudinal relation, lie on either side of the lateral axis of rotation The lower portion of the loop extending between the longitudinally opposed pair of pulleys is resiliently deformable in an upwards direction so that when the radially outward facing frictional surfaces on the radially extending arms are selectively rotated into frictional engagement with the lower surface of the stick held laterally in the holding location, the stick is forced upwards into frictional engagement with the lower resiliently deformable portion of the loop. With the stick forced upwards into engagement with the loop, the resilient nature of the belt accepts sticks of varying thickness and biases the stick downwards against the radially outward facing frictional surface on the radially extending arm. Advantageously, the loop and the radially extending arms are simultaneously selectively rotatable to translate in the forward longitudinal direction the stick so as to deposit the stick on the high speed longitudinal out-feed transfer means.

In the preferred embodiment, the holding location has a vertically extending stop which may be mounted in a stationary position adjacent the longitudinal in-feed transfer means. The stop may be mounted generally between the upper selectively rotatable stick receiving and translating means and the lower selectively rotatable stick lifting and translating means. The stop may be a vertically extending flange and, preferably, a vertically extending flange which does not extend vertically beyond the upper surface of the stick held laterally in the holding location against the stop.

BRIEF DESCRIPTION OF THE DRAWINGS

FIG. 5 is a cut-away view along line B—B in FIG. 3, with the sticks removed from the holding location on the in-feed transfer chain.

DETAILED DESCRIPTION OF THE PREFERRED EMBODIMENT

Figure 1:
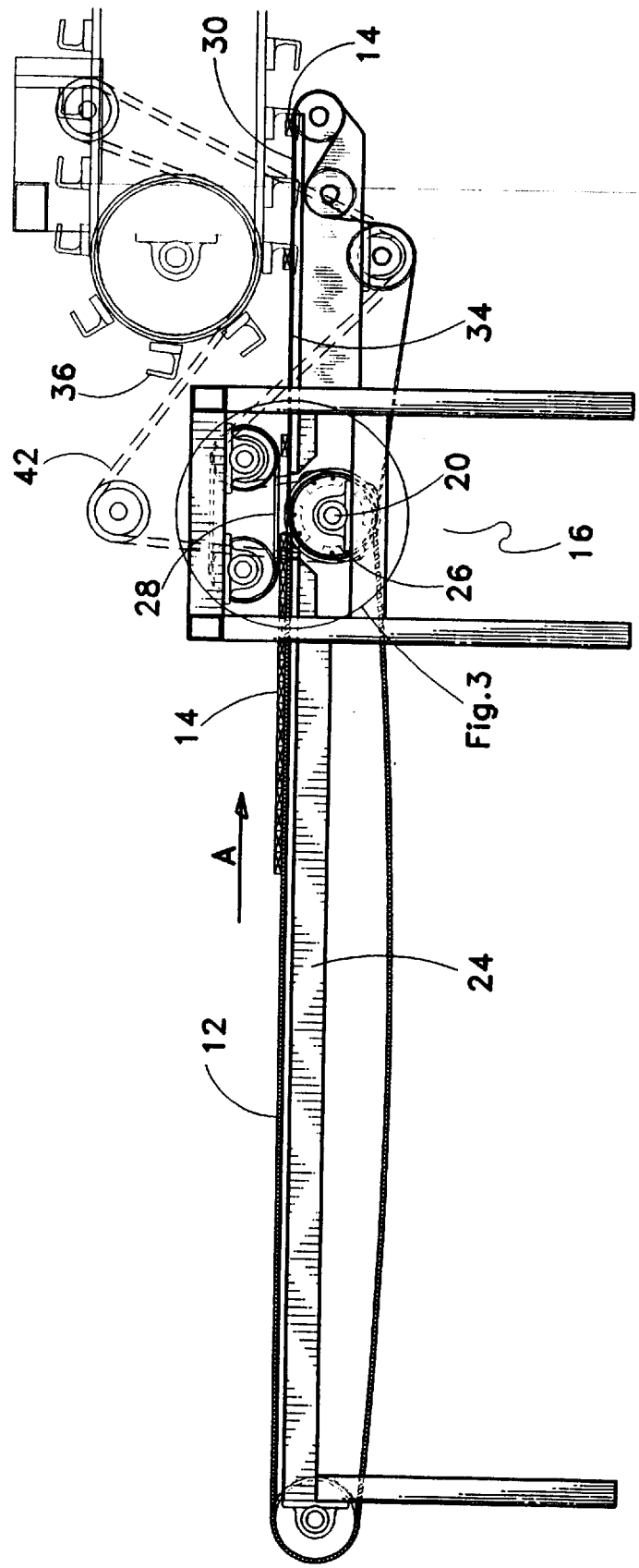
FIG. 1 is a side elevation view of an in-feed transfer chain and the stick singulator and allocator of the present invention.
Figure 2:
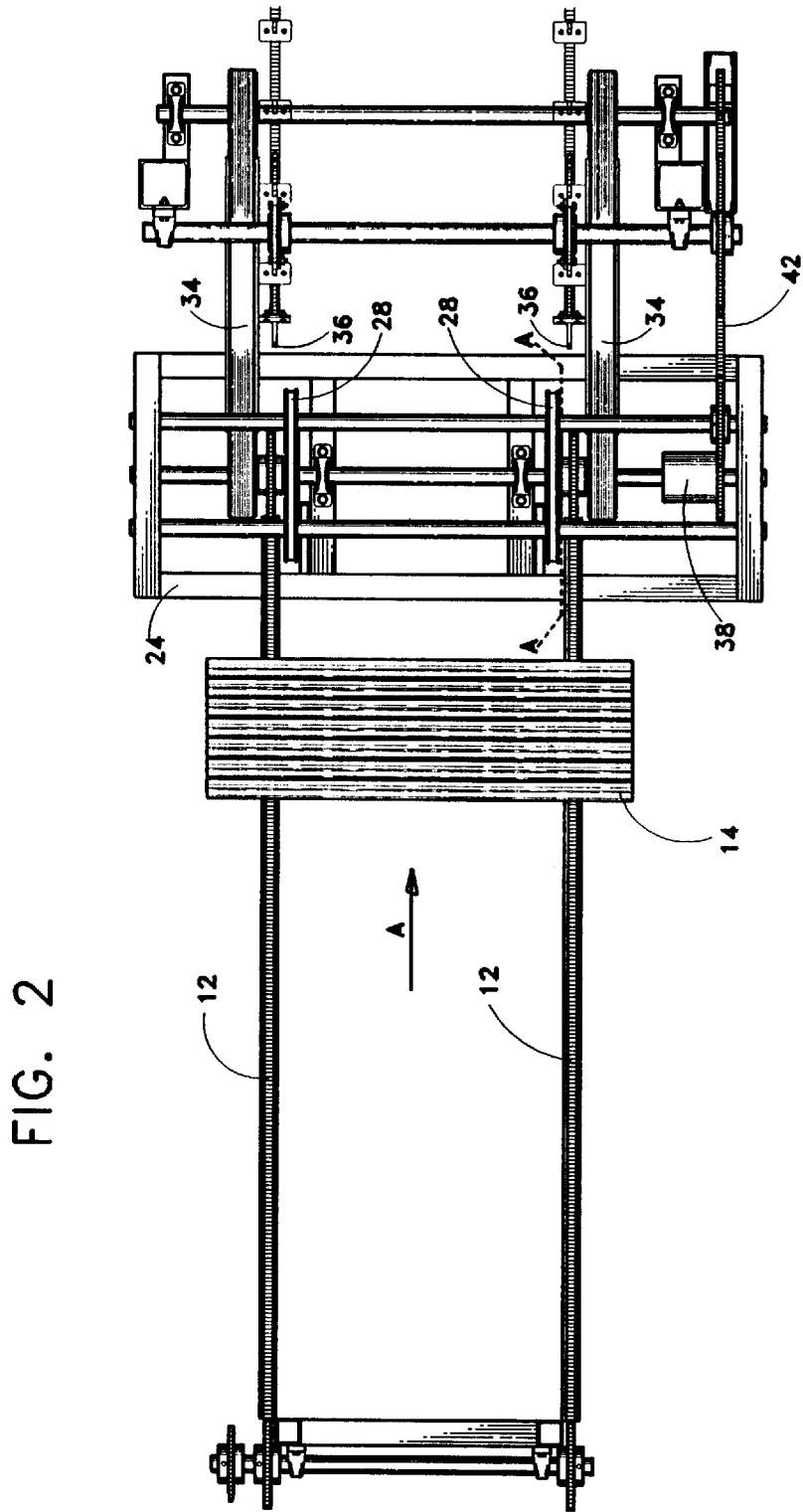
FIG. 2 is a plan view of the in-feed transfer chain and stick singulator and allocator of FIG. 1.

As illustrated in FIGS. 1 and 2, in-feed transfer chain 12 transfers or conveys elongated members such as spacing sticks 14 (hereinafter sticks 14) in direction A. It is understood that reference to sticks 14 includes other elongated members such as studs. Sticks 14 are transversely oriented to the longitudinal axis of transfer chain 12 as they are conveyed into the singulator and allocator 16 of the present invention, better seen in FIG. 3.

As illustrated in FIG. 2, transfer chain 12 is continuous on sprockets 18. Sprockets 18 may be idler sprockets rotatably mounted on transverse drive shaft 20. Sticks 14 conveyed in direction A on transfer chain 12 are brought to rest against a stop consisting of retaining flange 22. Retaining flange 22 may be rigidly mounted to frame 24 supporting transfer chain 12. Retaining flange 22 retains sticks 14 in a fixed location between feeder disc 26 and a resilient feeder belt 28. Preferably a laterally opposed pair of feeder discs 26 are rigidly mounted on drive shaft 20, and may be, in lateral relation, laterally between a laterally opposed pair of feeder belts 28.

Figure 3:
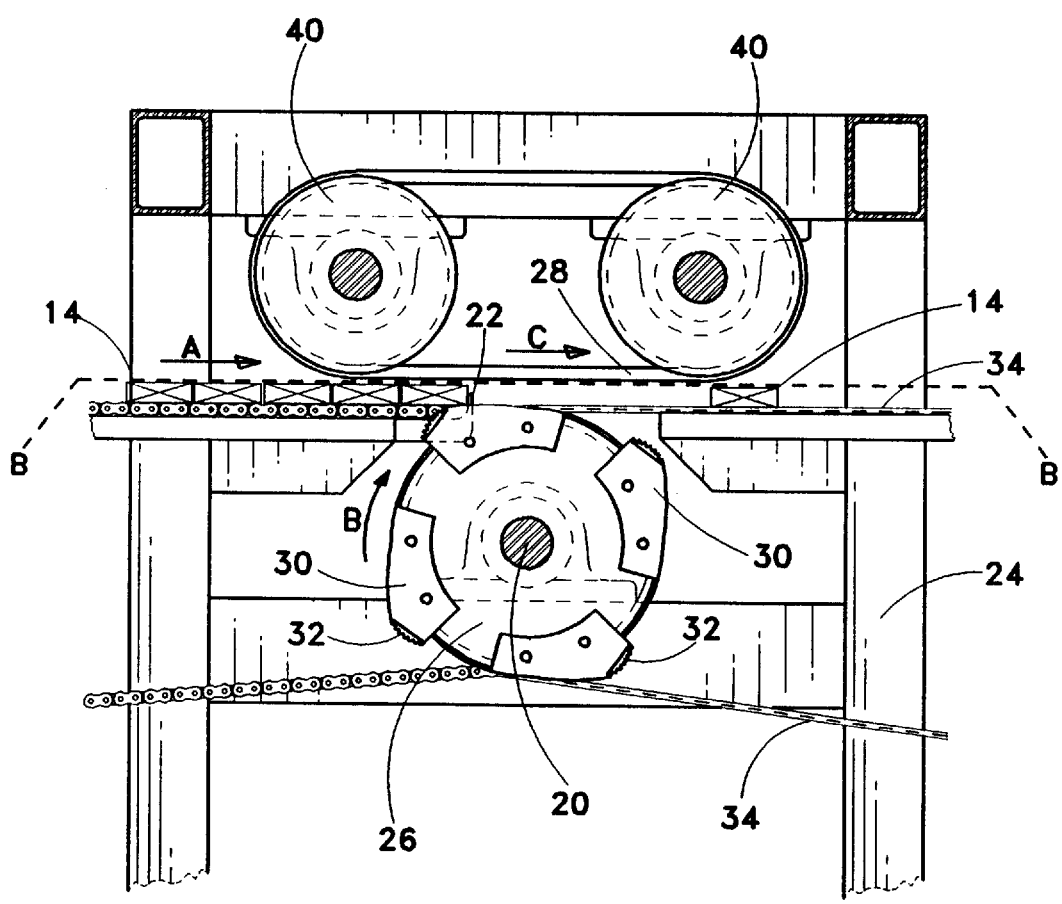
FIG. 3 is a cut-away view along line A—A in FIG. 2.
Figure 4:
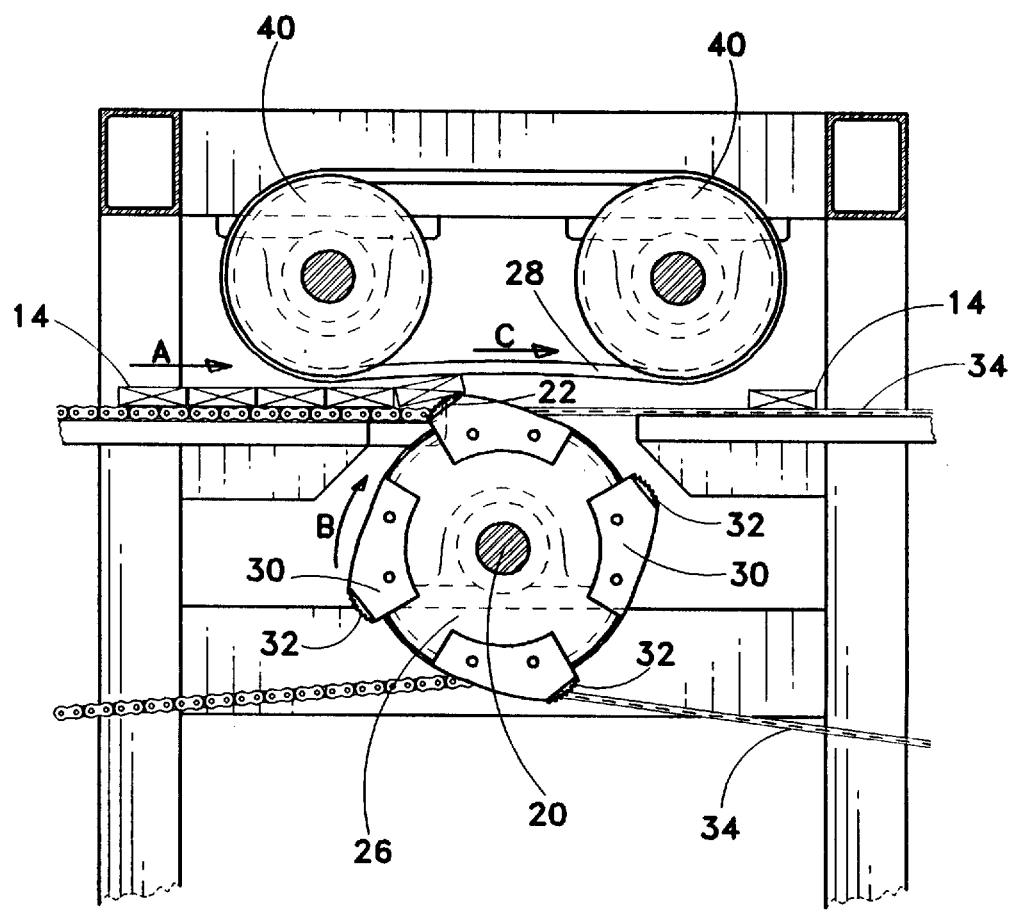
FIG. 4 is the view of FIG. 3 illustrating the lifting of a stick from the holding location on the in-feed transfer chain.

As best seen in FIGS. 3–5, feeder belt 28 operates in conjunction with a plurality of radially spaced apart radially extending transfer arms 30 rigidly mounted on, and radially extending from, feeder discs 26. Transfer arms 30 have radially extant stick-engaging surfaces 32, which, as illustrated, may have teeth to assist engaging the under-surface of a stick 14 retained against retaining flange 22.

When it is desired to transfer a stick 14, from its holding location against retaining flange 22 on transfer chain 12, onto high-speed intermediate conveyor belts 34 so as to convey stick 14 onto a rapidly moving stick conveyor such as conventional "J"-hook conveyor 36, feeder discs 26 are rotated in direction B by the operation of clutch 38 rotating drive shaft 20. The operation of clutch 38 is preferably computer controlled to synchronize the feed of sticks 14 onto J-hook conveyor 36. Stick-engaging surfaces 32 operate as rising cam surfaces to frictionally engage a stick 14 resting against retaining flange 22 and thereby force stick 14 upwards over retaining flange 22. Stick 14 is thereby trapped between stick-engaging surfaces 32 on transfer arms 30 and resilient feeder belts 28. Feeder belts 28 will operate to accept approximately plus or minus ¼ inch non-uniformity of thickness of sticks 14 without need for adjustment of the spacing between feeder belts 28 and stick-engaging surfaces 32.

Feeder belts 28 are rotatable continuously in direction C on pulleys 40, one of which may be a drive pulley and the other of which may be an idler pulley. The speed with which feeder belt 28 rotates in direction C matches the rotational speed of stick-engaging surfaces 32 so as to convey a stick 14 trapped between feeder belts 28 and stick-engaging surfaces 32 onto high-speed intermediate conveyor belts 34 as stick 14 is released from between feeder belts 28 and stick-engaging surfaces 32 by the rotation of stick-engaging surfaces 32 away from under stick 14 in direction B.

Feeder belts 28 may be driven by a linkage between drive shaft 20 and the drive pulleys of pulleys 40. By this means feeder discs 26 and feeder belts 28 may, desirably, be rotated at the same rate.

Drive belt 42 may be employed to rotate drive shaft 20 via clutch 38. Drive belt 42, illustrated in FIG. 2 and shown in dotted outline in FIG. 1, is driven by sprocket gear and chain linkage to J-hook conveyor 36 so that, when J-hook conveyor is operating, stick allocator 16 may be operated by engaging clutch 38.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A stick allocator for transferring and accelerating laterally aligned sticks between a holding location on a longitudinal in-feed transfer means and a high-speed longitudinal out-feed transfer means, comprising:

a lower, selectively rotatable, stick lifting and translation means, disposed generally beneath said holding location, for frictionally engaging a lower surface of a stick held laterally in said holding location and lifting said stick so as to frictionally engage an upper surface of said stick with an upper selectively rotatable stick receiving and translating means, disposed generally above said holding location, said upper selectively rotatable stick receiving and translating means for frictionally engaging said upper surface of said stick and biasing said stick against said lower selectively rotatable stick lifting and translating means, said upper selectively rotatable stick receiving and translating means and said lower selectively rotatable stick lifting and translating means for selectively translating and accelerating said stick held between said upper selectively rotatable stick and translating means and said lower selectively rotatable stick receiving and translating means in a forward longitudinal direction from said holding location so as to selectively deposit said stick onto said high-speed longitudinal out-feed transfer means, wherein said stick has thickness between said upper surface and said lower surface, and wherein said lower-selectively rotatable stick lifting and translating means comprises a radially extending cam means for fictionally engaging said lower surface of said stick held laterally in said holding location-said radially extending cam means selectively rotatable about a lateral axis of rotation, said holding location having a stop for holding a stick in upstream abutted relation thereto, said lateral axis of rotation a first vertical distance beneath said holding location, said radially extending cam means extending radially a second distance from said lateral axis of rotation, and wherein said second distance is greater than said first vertical distance, and wherein said upper selectively rotatable stick receiving and translating means comprises a continuous, selectively rotatable, stick engaging surface selectively rotatable in a longitudinal direction corresponding to said longitudinal direction of rotation of said selectively rotatable radially extending cam means, said continuous stick engaging surface selectively rotatable at a longitudinal velocity corresponding to a longitudinal velocity of said radially extending cam means, and wherein said continuous stick engaging surface is resiliently deformable, and, when in non-deformed state, a third vertical distance generally vertically above said lateral axis of rotation, the difference between said first vertical distance and said third vertical distance less than said thickness of said stick, and wherein said upper selectively rotatable stick receiving and translating means and lower selectively rotatable stick lifting and translating means are simultaneously selectively rotatable, so as to lift a stick from said holding location, resiliently pinch said stick, and accelerate said stick onto said-high-speed longitudinal out-feed transfer means.

2. The device of claim 1 wherein said longitudinal in-feed transfer means translates said sticks in said forward longitudinal direction at a first speed and said high speed longitudinal out-feed transfer means translates said sticks in said forward longitudinal direction at a second speed, and wherein said second speed is greater than said first speed.

3. The device of claim 2 wherein said continuous stick engaging surface is a resiliently deformable belt extending longitudinally in a continuous loop lying in a first plane, and wherein said lower selectively rotatable stick lifting and translating means comprises a radially spaced apart array of radially extending cam means, and wherein said first plane is parallel to a second plane containing said radially spaced array of radially extending cam means, and wherein said first plane and said second plane are generally vertical.

4. The device of claim 3 wherein said radially spaced array of radially extending cam means comprises of a radially spaced array of radially extending arms rigidly mounted to, and radially extending outward from, a selectively rotatable hub selectively rotatable about said lateral axis of rotation.

5. The device of claim 4 wherein said radially extending arms comprise at their distal ends radially outward facing frictional surfaces.

6. The device of claim 5 wherein said resiliently deformable belt extends continuously around a longitudinally opposed pair of pulleys, said longitudinally opposed pair of pulleys, in longitudinal relation, on either side of said lateral axis of rotation, said resiliently deformable belt resiliently deformable in a lower portion of said loop extending between lower extremities of said longitudinally opposed pair of pulleys, whereby said radially outward facing frictional surfaces are selectively rotatable into frictional engagement with said lower surface of said stick held laterally in said holding location so as to force said stick held laterally in said holding location upwards into frictional engagement with said lower portion of said loop, said lower portion of said loop biasing said stick against said radially outward facing frictional surfaces of said radially extending arms, said loop and said radially extending arms simultaneously selectively rotatable to thereby translate in said forward longitudinal direction said stick so as to deposit said stick on said high-speed longitudinal out-feed transfer means.

7. The device of claim 6 wherein said stop is mounted in a position adjacent said longitudinal in-feed transfer means at a downstream end thereof, said stop generally between said upper selectively rotatable stick receiving and translating means and said lower selectively rotatable stick lifting and translating means.

8. The device of claim 7 wherein said stop comprises a vertically extending flange for abutment of a side surface of said stick held laterally in said holding location against said vertically extending flange, said vertically extending flange not extending vertically beyond said upper surface of said stick held laterally in said holding location. axle along said lateral axis of rotation.

9. The device of claim 8 wherein said hub is a disc rigidly mounted on a selectively rotatable axle along said lateral axis of rotation.

* * * * *